G. KISTNER.
BASKET HANDLING MACHINE.
APPLICATION FILED SEPT. 3, 1915.

1,243,185.

Patented Oct. 16, 1917.
2 SHEETS—SHEET 1.

Witnesses:—

Inventor
G. Kistner.
By
Attorney

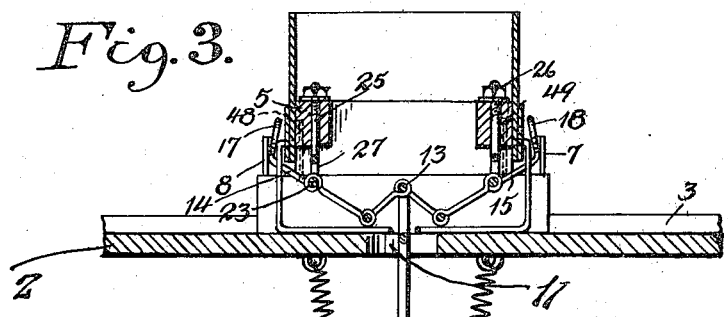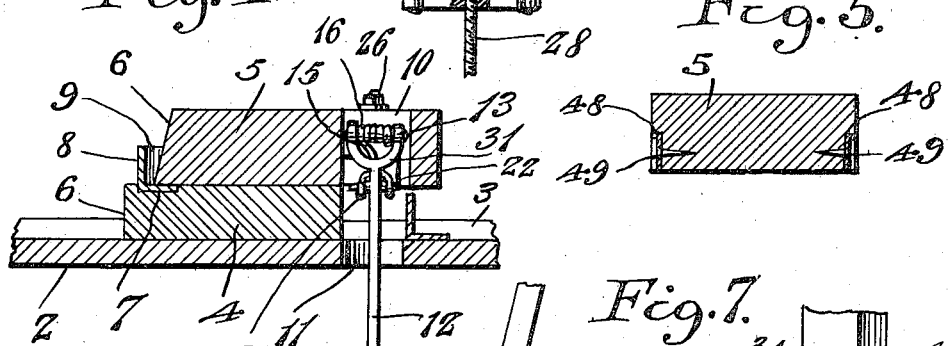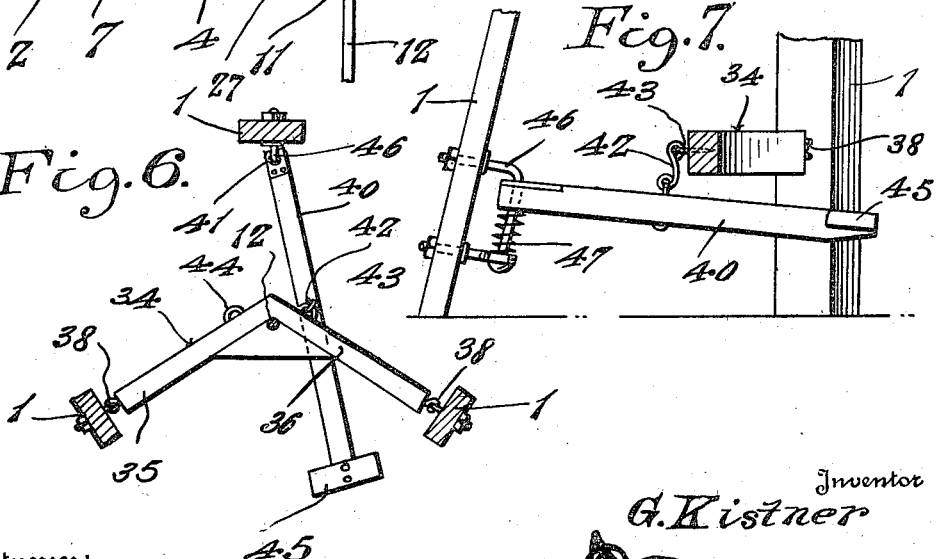

UNITED STATES PATENT OFFICE.

GEORGE KISTNER, OF NAPLES, NEW YORK.

BASKET-HANDLING MACHINE.

1,243,185.  Specification of Letters Patent.  Patented Oct. 16, 1917.

Application filed September 3, 1915. Serial No. 48,889.

*To all whom it may concern:*

Be it known that I, GEORGE KISTNER, a citizen of the United States, residing at Naples, in the county of Ontario and State of New York, have invented certain new and useful Improvements in Basket-Handling Machines; and I do hereby declare the following to be a full, clear, and exact description of the invention, such as will enable others skilled in the art to which it appertains to make and use the same.

This invention relates to a machine for attaching the handles to veneer fruit baskets, such as a basket employed for packing grapes for shipping or transportation, and the primary object of the invention is to provide a machine as specified which is comparatively simple in construction, and easy to operate and which will attach the handles to the basket with a minimum amount of labor.

Another object of this invention is to provide a machine as specified, which includes a pair of pivotally supported handle gripping members shaped for forcing the handles through the sides of the basket and controlled by the vertical movement of a rod, which rod is in turn connected to a foot treadle, so that when the foot treadle is depressed, the pivoted members will be operated for forcing the ends of the handle through the sides of the basket, and further to provide means for automatically returning the foot treadle and the handle engaging members to a position for receiving a second handle immediately after one has been applied to a basket.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Fig. 3 is a fragmentary vertical section through the head of the machine,

Fig. 4 is a vertical section taken transversely through the section illustrated in Fig. 3, Fig. 5 is a fragmentary cross section through a part of the machine, Fig. 6 is a horizontal section, showing in plan the foot treadle and its supporting means, and Fig. 7 is a fragmentary view partially in section and partially in side elevation of the foot treadle and its supporting means.

Figure 1:
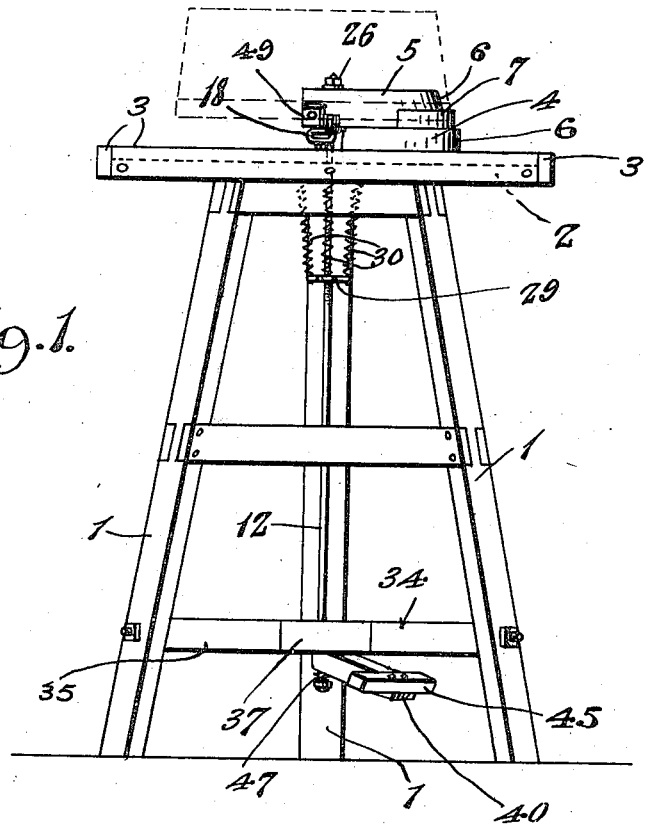
Figure 1 is a side elevation of the improved basket handling machine.
Figure 2:
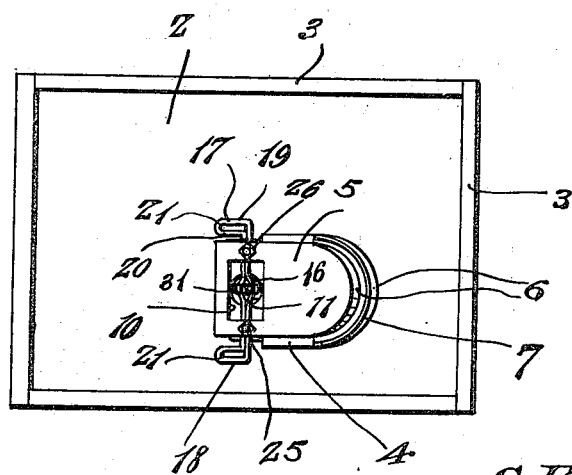
Fig. 2 is a top plan view of the machine.

Referring more particularly to the drawings, 1 designates the supporting structure of the machine, which has a table 2 secured to the upper surface of the same. The table 2 has upstanding sides 3, which project above the upper surface of the table, and are provided for preventing the bails or handles from sliding off the top of the table.

The table 2 has a block 4 secured to its upper surface substantially centrally thereof, which block has a second block 5 mounted upon its upper surface. The corresponding ends of the blocks 4 and 5, are curved, as is shown at 6, to conform to the curvature of the ends of the basket to which the handles are to be applied. The block 5 has its curved end 6 positioned inwardly of the curved end 6 of the block 4, and tapering, as is clearly shown in Fig. 4 of the drawings. A metallic plate 7, which is substantially L-shaped in cross section, is secured to and has its horizontal side countersunk within the upper surface of the block 4. The vertical side 8 of the plate 7 extends upwardly, rearwardly of the curved end 6 of the block 5, and provides, in combination with the curved end 6 of the block 5, a slot 9, which receives the upper edge of the end of the basket. The block 5 projects beyond the end of the block 4 remote from the curved end 6, and is provided with a rectangularly shaped opening 10 which is positioned directly above an opening 11 that is formed in the table top 2.

A vertical rod 12 extends upwardly through the opening 11, and into the opening 10, and it has a transversely extending rod 13 connected to its upper end. The rod 13 has the inner end of pivotally supported handle gripping members 14 and 15 connected thereto, as is shown at 16. The handle gripping members 14 and 15 are constructed preferably of wire, bent to form handle end gripping sections 17 and 18 which have slightly spaced sides 19 and 20, between which a space 21 is provided for receiving the ends of the wire handles to be attached to the basket. The members 14 and 15 are coiled intermediate of their ends, as is shown at 22, about rods 23 and 24. The rods 23 and 24 are substantially right angularly shaped, and have their vertical portions 25 extending upwardly through the block 5. They are held in place by any suitable means, such as nuts, indicated at 26. The angled ends of the rods 23 about which the members 14 and 15 are coiled as shown at 22, are placed within openings 27 which are formed in the sides of the block 5 and communicate with the centrally disposed rectangularly shaped opening 10.

The rod 12 has a section thereof externally screw threaded, as is shown at 28. A plate 29 is adjustably mounted upon the screw threaded portion 28 of the rod 12 and has a plurality of spiral springs 30 connected thereto, which springs are in turn connected to the under surface of the table top 2. By adjusting the plate 29 upon the rod 12, the tension of the spring 30 may be regulated, as desired, for regulating the return movement of the rod 12.

The upper end of the rod 12 is preferably bifurcated or forked, as is shown at 31, so as to properly support the rod 13.

The lower end of the rod 12 is connected at the apex of an angularly disposed frame 34. The frame 34 is composed of a pair of bars 35 and 36, which have their meeting ends connected, and disposed at oblique angles with respect to each other. A triangularly shaped block 37 is secured to the inner surfaces of the inner side edges of the bars 35 and 36, and the rod 12 is connected to the apex of this triangularly shaped portion, as is clearly shown in Fig. 6 of the drawing. The bars 35 and 36 are connected by links, as is shown at 38, to the supporting structure 1. A treadle lever 40 is connected by links to the frame 1, as is shown at 41, and it is detachably connected by means of a hook 42 and an eye 43 to the frame 34. A second hook 44 is provided, which is positioned upon the opposite side of the apex of the frame 34 from the hook 43, and it is adapted also for connection with the hook 42, when it is desired to change the position of the lever 40. A tread 45 is mounted upon the free end of the lever 40. The lever 40 has its end remote from the tread 45, slidably mounted upon the bight portion of a substantially U-shaped bolt 46. A spiral spring 47 is interposed between the under surface of the end of the lever 40 and one leg of the U-shaped bolt 46, as is clearly shown in Fig. 7 of the drawings.

The block is reinforced by metallic plates 48, which are positioned in recesses 49 formed in the sides of the block, against which the inner ends of the bail, (not shown), is forced, after it has been forced through the basket.

In the operation of the improved basket handling machine: A basket is inverted, and placed mouth downward upon the block 4, having its end positioned between the upstanding vertical side 8 of the plate 7, and the curved inclined end 6 of the block 5, which properly positions the sides of the basket oppositely of the plates 48. A wire basket handle or bail is then positioned so that its angularly bent ends extend through the spaces or eyes 21 formed in the ends 17 and 18, of the members 14 and 15. The treadle lever 40 is then depressed, which moves the rod 12 downwardly, and consequently the rod 13, rocking the members 14 and 15 upon their pivotal connection with the bolts or rods 23 and 24. The downward movement of the rods 12 and 13, will force the ends 17 and 18 inwardly, and consequently force the ends of the handle or bail through the sides of the basket, and against the plates 48, which will crimp or bend the ends of the handles, and efficiently connect the handle to the basket.

From the foregoing description taken in connection with the accompanying drawings the advantages of construction and of the method of operation of the improved basket handling machine will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a basket handling machine, a supporting frame, a table top carried by said frame, a basket receiving form carried by the upper surface of said table and composed of a pair of blocks, one overlying one end of the other block, an upstanding plate secured to the lowermost of said blocks and extending upwardly and being spaced slightly from the corresponding end of the upper block for receiving the edge of a basket therebetween, and means pivotally carried by said overlying block for engaging the ends of a basket handle or bail and forcing them through the sides of a basket.

2. In a basket handling machine, a supporting frame, a table top carried by said frame, a basket receiving form carried by the upper surface of said table and composed of a pair of blocks, one overlying one end of the other block, an upstanding plate secured to the lowermost of said blocks and extending upwardly and being spaced slightly from the corresponding end of the upper block for receiving the edge of a basket therebetween, a pair of basket handle engaging members pivotally supported by said overlying block, a vertically extending rod connected to said pivotally supported members and extending downwardly through said table top, and a treadle connected to the lower end of said rod for moving the rod longitudinally for operating said handle engaging members.

3. In a basket handling machine, a supporting frame, a table top carried by said frame, a basket receiving form carried by the upper surface of said table and composed of a pair of blocks, one overlying one end of the other block, an upstanding plate secured to the lowermost of said blocks and extending upwardly and being spaced slightly from the corresponding end of the upper block for receiving the edge of a basket therebetween, a pair of basket-handle-engaging members pivotally supported by said overlying block, a vertically extending rod connected to said pivotally supported members and extending downwardly through said table top, a treadle connected to the lower end of said rod for moving the rod longitudinally for operating said handle engaging members, said overlying block being provided with cutout portions formed in the sides of the same and positioned in alinement with the handle engaging portions of said pivoted members, and metallic crimping plates positioned within said cutout portions.

In testimony whereof I affix my signature in presence of two witnesses.

GEORGE KISTNER.

Witnesses:
 GEO. R. GRANBY,
 FRED W. FOX.

Copies of this patent may be obtained for five cents each, by addressing the "Commissioner of Patents, Washington, D. C."